United States Patent [19]

Smith et al.

[11] Patent Number: 4,896,452
[45] Date of Patent: Jan. 30, 1990

[54] SOLAR POWERED BAIT BOX

[76] Inventors: Harry D. Smith, 15645 W. Gardner Rd., Gardner, Kans. 66030; Fletcher D. Sapp, 7714 Garnett, Lenexa, Kans. 66214

[21] Appl. No.: 364,644
[22] Filed: Jun. 12, 1989
[51] Int. Cl.[4] .......................................... A01K 97/04
[52] U.S. Cl. ........................................ 43/57; 43/17.1
[58] Field of Search ............................... 43/57, 17.1

[56] References Cited

U.S. PATENT DOCUMENTS

4,261,131  4/1981  Poffenberger ..................... 43/57
4,625,447  12/1986  Buchanan ......................... 43/17.1
4,677,785  7/1987  Lambourn ......................... 43/57

Primary Examiner—M. Jordan
Attorney, Agent, or Firm—Thomas M. Scofield

[57] ABSTRACT

Improvements in the use of solar cell panels with respect to certain fishing equipment; providing solar cell panel power for aerators used in water containing live bait held in bait buckets or containers; a solar cell panel or panels mounted on, in or in conjunction with top closure members of live bait containers for fishing wherein the position of the top can be adjusted from horizontal to receive maximum solar energy by tilting the top closure and properly positioning the live bait container with respect to the position of the sun; live fishing bait containers utilizing an aerator therein for the water receiving the live bait inside the container wherein the aerator is alternately driveable by a solar cell panel incorporated into the top closure member of the bait container or a separate battery, said battery being rechargeable and also rechargeable from energy provided by the solar cell panel array.

2 Claims, 3 Drawing Sheets

SOLAR POWERED BAIT BOX

BACKGROUND OF THE INVENTION

As may be seen from one of the patents cited hereinafter this specification, it is well known to provide an aerating device which can float in the water of a minnow bucket or other live fish bait container and oxygenate the water therewithin to keep the minnows or other bait alive. This patent, Bell 3,189,334 "Aerating Device" issued June 15, 1965, shows such an aerator device which is powered by one or more battery cells, the latter mounted in a container removably attachable to the top edge of the bait bucket.

The rationale of aerating the water in which minnows or other fish may be kept alive is well established, specifically, the number of minnows/fish with respect to the quantity of the water in the container quickly exhaust the available supply of oxygen in the water. It is known to periodically change the water in the bucket from time to time, but this is something easily forgotten and/or excessively delayed and is an irksome job sometime resulting in the accidental loss of bait fish. Numerous devices, including that of the said Bell 334 patent, have been proposed for continuous aeration.

However, the power supply to said aerator, when only a battery is used, is only too readily exhausted during long intervals of fishing, whereby the batteries need to be periodically replaced. It would be most desirable to provide a power source which, alone or in combination with an alternative battery power source, will drive the aerator at least during the daytime light house, being relievable by the battery power source on a cloudy day, at night, at dawn or dusk and the like.

The subject invention is directed to the provision of a solar cell panel or panels placed upon the top or lid of a bait container, such able to utilize the sun's rays to power an aerating device in or associated with the water in the live bait container. The addition of this new power supply can be used alternatively with a battery power supply to run the aerator and, additionally, if the battery or batteries, are rechargeable, such can be recharged from the solar panel cell array any time the aerator is not being driven by the solar panel. This includes intervals when the aerator is not driven by any power source, either solar cell or battery and when the aerator is being driven by the battery power itself.

In this manner, the aerator may be continuously powered for long intervals of time without problems of battery replacement or loss of power and, additionally, the two alternative power sources (solar panel and batteries) are optimally used with respect to one another and themselves.

THE PRIOR ART

Applicant is aware of the following patents directed to aerating devices, per se for liquids, specifically:

3,416,729 "Liquid Aerator" issued Dec. 17, 1968 to Ravitts et al (This patent shows an aerator usable to aerate water from (typically) water in a cooling tank, a pond or a waste treatment pool) and 3,189,334 "Aerating Device", Bell, issued June 15, 1965. (This patent shows an aerating device in a minnow bait bucket driven by a battery carried on the top edge of the open bucket.

Applicant is aware of the following patents directed to solar cell powered rotating devices:

Myers 3,618,254 "Fishing Device" issued Nov. 9, 1971, showing a float having a fishing line associated therewith and a sail, solar cells 27 and 28 controlled by hand control switch 26 to actuate motor 16 to drive propellor 20.

Devitt 4,432,273, issued Feb. 21, 1984 "Fan Powered Roof Venting Method And Apparatus" showing a fan 54 on shaft 56 driven by motor 58, said motor powered by solar cell 84 carried by support structure 32.

Thompson 4,517,758, issued May 21, 1985 "Light Bulb Attached Sign Assembly". This patent discloses the attachability of a frame carrying a solar cell to a light bulb operative to power the solar cell which, in turn, powers a rotational device such as a fan or display thereunder.

MATERIALS, SOLAR CELLS, ETC.

As a specific example of a rechargeable battery which may be used advantageously in connection with the subject invention, reference is made to the disclosure set forth in the three page mailer or brochure entitled "The Carefree Force" showing rechargeable batteries under the trademarks "Carefree" and "Carefree Magnum" produced by Eagle-Picher Industries, Inc. of Seneca, Missouri 64865. The solar cell energizers of the type disclosed in the subject case can be used alternatively to run the aerator in the bait box or recharge the battery when the bait box is empty or when the battery is being used to power the motor of the aerator. Substantially any rechargeable battery can be employed, but specific examples of rechargeable batteries are shown in detail, structure and specifications, in the said three page (double sided printing and pictorization) brochure of Eagle, Inc., Commercial Products Department, P.O. Box 130, Seneca, Missouri 64865. Applicant will provide a print of this brochure or mailer either with the case as filed or shortly thereafter under the USPTO Rules.

The aerator to be powered in the subject bait buckets or containers is not, per se, any part of the subject invention. Any commercial aerator useable in a bait container or bait bucket may be employed, particularly including that commercial aerator referred to as "Mino-Mizer" of which an illustration and direction card will be transmitted with the filing of this case or submitted to the Patent Office later under the Rules. The "Mino-Mizer" "cools the water by atomizing it into an oxygen absorbing water mist. " The Mino-Mizer is shown as floating in the bait bucket or box on the surface of the water therein and hooked up to a (conventional) power source comprising a 6 volt DC battery or 12 volt such (with converter). This device appears to be similar to or identical to the aerator seen in Bell 3,189,334 listed in the Prior Art section.

The solar photovoltaic panel(s) useable in the subject application are also not, per se, the invention. That is, known and commercially available solar cells and cell arrays are used and can be used to power the aerator or other device inside the bait box or other container, such carrying the solar panel(s) in or on all or part of the openable and/or removable top thereof.

As a specific example, not limiting of such a solar panel would be an amorphous, thin film, solar voltaic or photovoltaic panel of either 6 volt or 12 volts DC at 150 to 200 milliamp output. A 6 volt solar panel array works, alternatively, with a 6 volt DC battery to drive the load, such as the above noted Mino-Mizer, no converter being required.

Amorphous silicon photovoltaic Power Components produced by the Solarex Corporation, The Thin Film Division, 826 Newton-Yardley Road, Newton, Pennsylvania 18940, (World Headquarters Eastern Regional Office, 1335 Piccard Drive, Rockfield, Maryland, USA 20850) may be used in this application. Background with respect to the amorphous, thin film, solar, photovoltaic panel preferably useable in this application are found in the Solarex Corporation brochure "Amorphous Silicon For Consumer And Industrial Products", a two page mailer or brochure printed on each side of the two pages and disclosing photovoltaic power components for small consumer and light industrial electronics. As further background see the Solarex Corporation three page (printed both sides) brochure entitled "Photovoltaic Power For Telecommunications" for actual examples of modules actually useable in the bait box and container top applications. The SA-5 (Amorphous Silicon), SA-2 (6 V) (Amorphous Silicon) and SA-1 (Amorphous Silicon) low power modules disclosed and specified in the 1987 nine page Solarex Corporation catalog or brochure "Photovoltaic Products" are examples of solar panels, not limiting, which are specifically useable in this application.

Copies of all of the disclosure materials referred to hereinabove will either be furnished with filing of the application or later according to Patent Office Rules for submission of prior art and background art.

Applicant notes that the solar cells disclosed in the three solar cells powered devices Meyers 254, Devitt 273 and Thompson 758 are merely described as solar cells. However, in order to make the subject disclosure more precise and enable anyone skilled in the art to duplicate the invention, additional information as noted above is here given and supplied in the reference referred to.

OBJECTS OF THE INVENTION

A first object of the invention is to provide a new and useful power source for energizing and operating an aerating device in a minnow or bait bucket or container by means of a solar cell array fixed to or positioned on or in the top or a portion of the top of the minnow bucket or bait bucket.

Another object of the invention is to provide the combination of a solar cell array attached to a portion of a bait or minnow box, preferably the top thereof, and a rechargeable battery associated with the bait box whereby either the solar panel array or the rechargeable battery can (alternately) be employed to run the aerator in the bait box and the solar cell array further may be employed (when the bait box aerator is not being powered by the solar cells) to recharge the battery associated with said bait box or bucket.

Another object of the invention is to provide a removable top for a container wherein is placed an electrically operated device such as, but not limited to an aerator for live bait in a bait box, the power for the electrically driven device in the container being driven by a solar cell array or, alternatively, a rechargeable battery and a solar cell array. In the latter use, the solar cell array available to power the electrically operated device or recharge the battery, as desired by the operator.

Still another object is to provide solar cell applications and arrays adaptable for use in connection with containers having totally or partially removable tops therefor, as well as in connection with containers for various applications wherein an electrically powered device is received within a capped or topped container, such electrically powered device (such as a oxygenating or aerating device for bait) being removably retainable within said container. An alternative source of power such as a rechargeable battery may also be associated with the container or any part thereof, including the top, which rechargeable battery may, at certain times, alternatively, power the electrically energized device within the container, such battery also rechargeable by the solar cell array associated with the top of the container.

Other and further objects of the invention will appear in the course of the following description thereof.

THE DRAWINGS

In the drawings, which form a part of the instant specification and are to be read in conjunction therewith, embodiments of the invention are shown and, in the various views, like numerals are employed to indicate like parts.

(a) To (alternatively) power the atomizer or aerator or electrically driven device inside the container which is normally driven by solar cell array when sun rays are available and (b) If the battery is rechargeable, such be rechargeable from the solar cell array itself when the latter is not driving the electrically powered device in the container.

FIG. 12 is in three parts with FIG. 12a showing the electrical schematic connection between the solar cell array and the electric motor of the aerator, FIG. 12b showing the battery connection with the motor of the aerator and FIG. 12c showing the electrical connections and circuit when the solar cell is recharging the battery.

Referring first to FIGS. 1-6, inclusive, wherein is shown a first form of the subject invention, what is shown in the views comprise, first, an inverted frustoconical bucket or container body 20 having a continuous near vertical side wall 20a and a bottom wall 20b. Body 20 alternatively may be cylindrical, oval, rectangular or square in horizontal transverse section. At 20c (see FIG. 2) there is indicated, by a dotted line, an optional, peripheral, inwardly inclined surface which may be present if ring portion 21 is a separate part of the entire top, to be described. Alternatively, ring portion 21 may be integral (along the surface 21c) with the top of side wall 20a, whereby such would be continuous therewithin and provide a shoulder 22, 22a adapted to receive therewithin a hinged top portion to be described.

Figure 2:
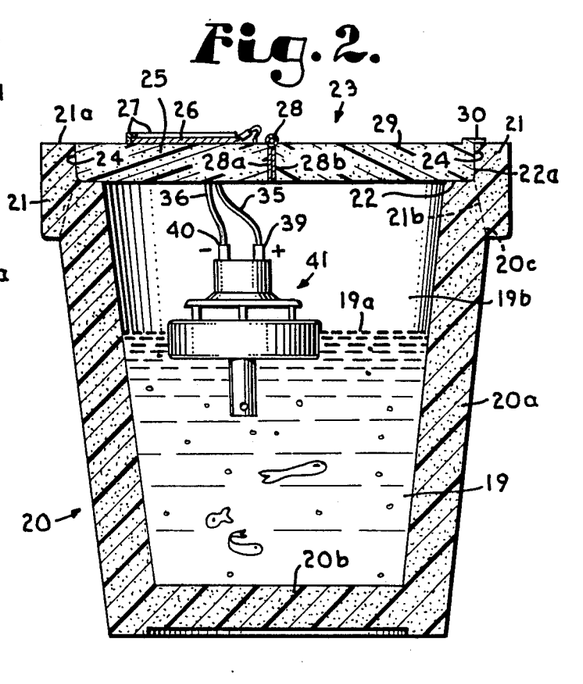
FIG. 2 is a vertical section through the device of FIG. 1 showing, in dotted lines, with respect to said top, the option of removability of the entire top or the option of at least the periphery of the top being integral with the lower container body. (In the container is shown a body of water having a conventional aerating device positioned therewithin, there being live bait (minnows) in the body of the water and power leads from the solar cell array on the top attached to the aerating device.)

First, assuming that severance surface 20c is not present, and upwardly extending wall portion 21 is integral with side wall 20a at the top thereof, there is then defined, circumferentially inwardly of the top of wall 20a, the shelf 22, 22a. The top wall of portion 21 is designated 21a. A removable, circular, inboard top portion generally designated 23 has a peripheral, normally vertical outer edge 24 thereon. One half of the circular insert top portion 23 is designated 25 and carries a solar cell panel or array 26 thereon removably received in a three sided surrounding frame 27. Hinge 28 has leaves 28a and 28b, the latter such fixed to the center line, diametric boundaries of the two halves of the top portion in the course of being described. The other half of the circular disc 23 is half circle member 29 to which is fixed hinge leaf 28b along the diametric inward face thereof opposed by like, central diametric face of top portion 25 connected to hinge leaf 28b.

Figure 1:
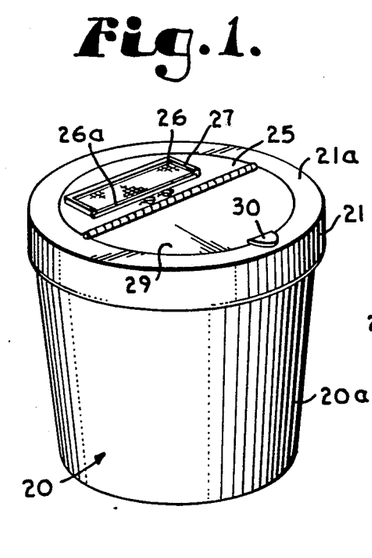
FIG. 1 is a three-quarter perspective view from above of a container which may have a totally removable or unremovable top construction associated therewith. (In this view, the top construction has a hinged portion for access to the interior of the container, whether or not the total top is removable, the non-hinged part of the container top carrying a solar cell array to power an electrically energized device within the container.
Figure 3:
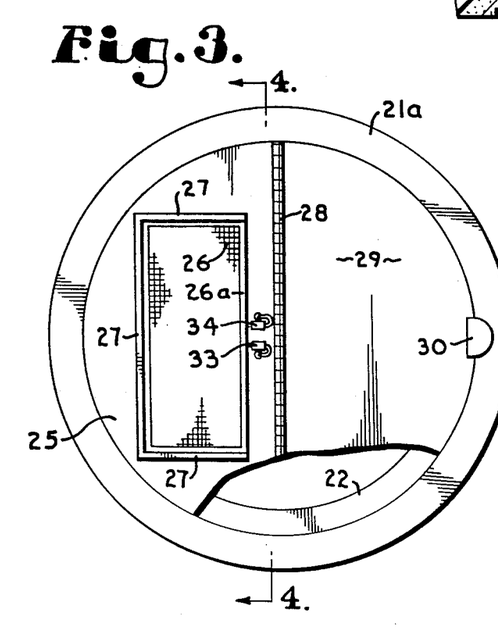
FIG. 3 is a top plan view of the container of FIGS. 1 and 2, a portion of the top of the container cut away to better show the wall construction of the container.

Lift tab 20 is preferably fixed to the top surface of top member 29 peripherally thereof and preferably centrally peripherally thereof as seen in FIGS. 1 and 3. This enables the lifting (see FIG. 5) of one half 29 of top 23 to give access to the inside of the subject bait bucket or container. Tab 30 may be horizontal as shown or somewhat upwardly angled for easier lifting of hinged top center portion 29.

Still assuming that peripheral circumferential ring top portion 21 is not integral with side wall 20a, then two further circumstances prevail. In the first case, portion 21 can be a ring separated from both wall 20a and inner top lid 23 which is removably fitted on the top of wall 20a before top lid 23 is removably received on shelf 22.

Alternatively, the inner 180° arc of wall portion 21 may be integral with the entire outer periphery of half circle top lid portion 25, whereby ring portion 21 and top lid 23 together may be alternatively removed from and applied to the top 22 of side wall 20a abutting surface 20c peripherally for 360°, but liftable away therefrom. In this case ring 21 and the periphery of lid portion 25 are integral with one another. In this case, the lifting tab 30, as well as the position of the peripheral lower edge or surface of lid portion 29 on shelf 22 maintains the entire top center lid 23 in a strong and not vulnerable construction with respect to the capacity to close and open top portion 29 with respect to the surround 21. In this last instance, in FIG. 2, left hand top of the view only, the line numbered 24 would be removed to show the integral continuity of center top lid portion 25 and a 180° arch of the surround or ring 21.

In the event that ring 21 is integral with the top of wall 20a, the center lid portion 23 may be inserted and removed as desired with respect to shelf 22, 22a. There would be no separation between ring portion 21 and the top of side wall 20a along the line 20c.

Figures 4, 5, 7, 8, 9:
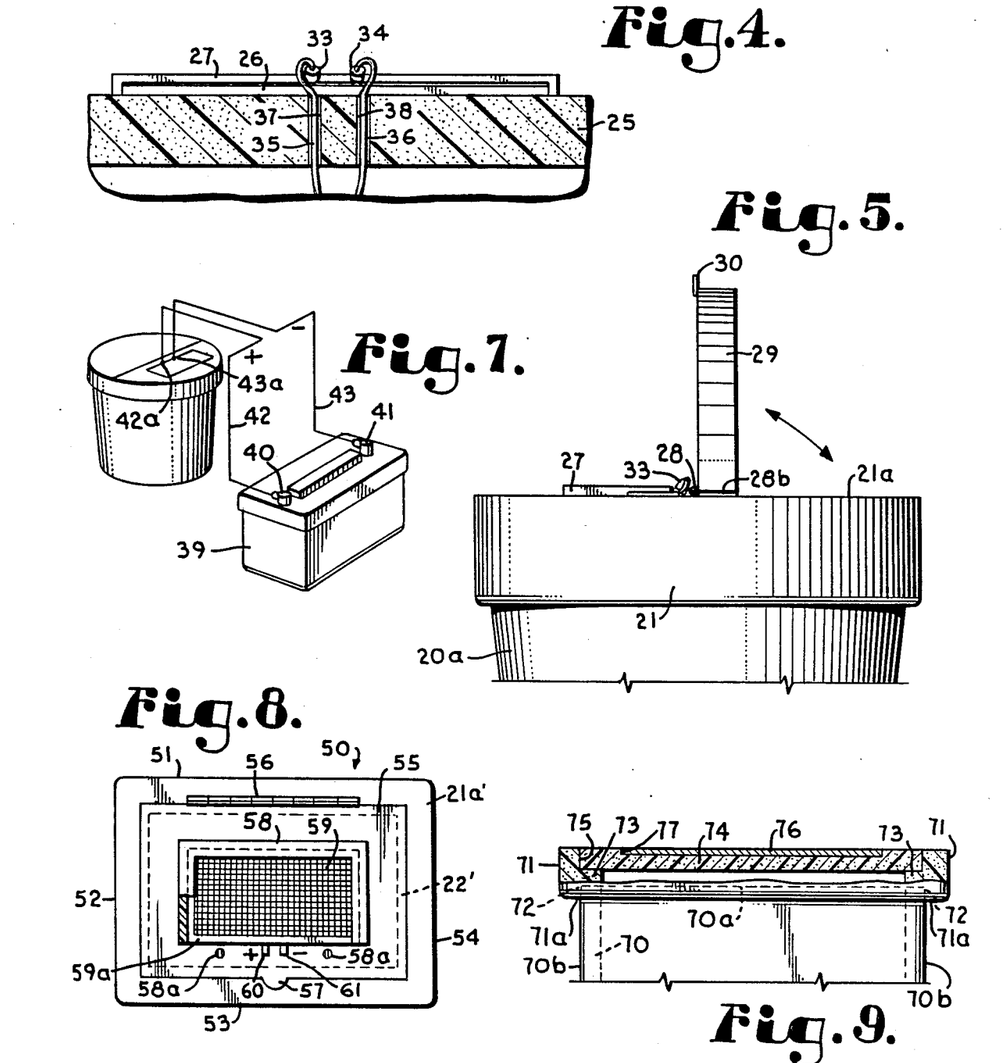
FIG. 4 is a sectional view through the container top taken along the line 4—4 of FIG. 3 in the direction of the arrows.
FIG. 5 is a side view of the container of FIGS. 1-4, inclusive showing the hinged portion of the top openable and closeable with respect to the container top and body without moving the rest of the top which contains the solar cell array.
FIG. 7 is a view showing a preferably rechargeable battery alternatively useable with the device of the previous figures in two modes.
FIG. 8 is a top plan view of a container having a hinged top thereon with a solar cell array mounted on or in the top surface of said top.
FIG. 9 is a front cut away view of the container of FIG. 8 in a portion of the top thereof to show how the periphery of the top is configured to receive the solar cell array in the hinged top itself as well as the hinged portion of the top in the container construction itself.
Figure 6:
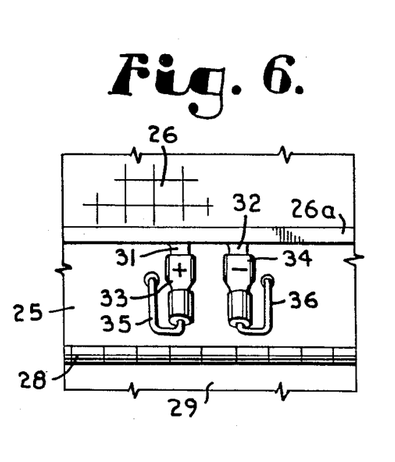
FIG. 6 is a top, enlarged, fragmentary view of the electrical connection seen in left center of FIG. 3 showing the positive and negative power leads from the solar cell arrays shown in FIGS. 1 and 3, as well as the removable connectors which enable uncoupling the solar cells from the power inputs to the work in the container.

In the views of FIGS. 1, 3 and 6, it may be seen that the solar cell panel or array 26 has a surrounding, confining rim or border 26a. Positive lead or terminal 31 and negative lead or terminal 32 (FIG. 6) extend from the periphery of the solar cell array 26 through rim or border 26a whereby to be removably engageable by conventional connectors 33 and 34 which are each, respectively, connected to insulated power lines or wires 35 and 36. In FIG. 4, a view taken sectionally through the top portion 25, it may be seen how the top portions of wires 35 and 36 (insulated wires) pass downwardly through openings or passageways 37 and 38 through arcuate top section 25. In FIG. 2, it can be seen that lines 35 and 36 pass to hard wired water proof 39 and 40 terminals on aerator 41. No details of the structure of the conventional or commercial areator 41 will be here given, such devices being well known commercial products. It is here noted that an aerator device as shown in U.S. Pat. Bell No. 3,189,334 noted above can be used in this application.

When the insulated wires 35 and 36 are present with the connectors 33 and 34 on the upper ends thereof, such engaging leads 31 and 32 of the solar cell array, with the said wires 35 and 36 passing through top lid portion 25 and having connectors 39 and 40 thereon (to engage terminals (not shown) at the top of aerator 41), the aerator will be in operation as may be seen in FIG. 2 when sufficient solar energy reaches panel 26. When aerator operation is to be stopped, the connector 39 and 40 are removed from the aerator terminals and aerator 41 may be removed from the container out of the entire top thereof if sections 21 and 25 are integral or out section 29 when it is open as in FIG. 5.

Alternatively, when the sun is too low to provide sufficient power to the solar cells or has gone down, etc. upper connectors 33 and 34 (FIG. 6) may be removed from terminals 31 and 32. At that time (see FIG. 7), a battery (preferably rechargeable) 39 having posts or terminals 40 and 41 may be connected through insulated electric wires or lines 42 and 43 to connectors 33 and 34 by suitable terminals after connectors 33 and 34 are removed from terminals 31 and 32 of the solar panel. The ends 42a and 43a of insulated wires 42 and 43 of FIG. 7 and, at least in part, may also comprise connectors of the type seen at 33 and 34 in FIG. 6 whereby to removably connect to the power terminals or leads 31 and 32 of the solar array.

In the latter case (where connectors at 42a and 43a are engaged to the leads or terminals 31 and 32), the action that occurs is that power provided from the solar cell array is used to recharge battery 39. In the former case, where terminals are provided at 42a and 43a like 31 and 32, such engaging into the freed wire end connectors 33 and 34, the power from the battery drives the aerator 41 through wires 35 and 36. All that is needed to enable both operations (charging the battery and driving the aerator from the battery) is for suitable connecting members/terminals to be provided at 42a and 43a on one end of wires 42 and 43.

In the connection of the battery posts or terminals 40 and 41 to connectors 33 and 34, as well as in the connection of the solar energy cells from terminals 31 and 32 to the battery in recharging thereof, the proper polarities with respect to the solar cell array, the battery and the aerator must be observed.

As previously noted, the battery 39 may be of very considerably less dimension than that seen in FIG. 7 and may be carried on the side of the bait container with respect to the top thereof in the manner seen in U.S. Pat. Bell No. 3,189,334. Alternatively, the preferably rechargeable battery may be separate from the bait box as seen in FIG. 7 and of any convenient size or dimensions with respect to the use in question. If the battery is not rechargeable, then the only use thereof is for terminals at 42a and 43a to be inserted into connectors 33 and 34 after the latter have been removed from terminals 31 and 32 of FIG. 6 so the battery drives the aerator.

The solar cell array 26 may be mounted in any convenient way on the static top portion 25 (non opening). In FIGS. 1-6, inclusive, a three sided C-frame (in top plan view) is employed to removably and slideably receive the solar cell array 26 with its surrounding rim 26a therewithin and thereunder. That is, looking at FIG. 3, as well as FIGS. 1 and 2, the three portions or sides of the frame are shown numbered 27, the right hand side thereof in FIG. 3 being open so that the solar cell array 26, 26a may be removed slideably to the right in the view of FIG. 3, to the right in the view of FIG. 2 and downwardly in the view of FIG. 6.

Before removing the solar cell array for cleaning, replacement or repair, connectors 33 and 34 must be removed from terminals 31 and 32 and the wires 35 and 36 pulled outwardly sufficiently through passages 37 and 38 that the solar cell panel may pass downwardly in FIG. 6 over the wires 35 and 36. Likewise, depending on the size and position of the solar cell array, such must be able to be moved to the right in FIG. 3 and downwardly in FIG. 6 over hinge 28. For this removal, in some cases, a floor underneath frame 27 and solar cell array 26, 26a may have to be supplied, such elevated sufficiently that the solar panel may be moved to the right in FIGS. 2 and 3 and downwardly in FIG. 6 at a height or level above the top surface of top portion 25, the wires 35 and 36 and the hinge 28 so as to avoid blocking of the removal of the cell from the frame 27 or any sort of interference by the solar cell panel with any of the named structures or features of the top.

When a new solar cell panel is to be inserted in frame 27, it is moved from the right to the left in FIGS. 2 and 3 and upwardly in FIG. 6 over hinge 28, wires 35 and 36 and connectors 33 and 34 to the working position of the cell 26, 26a seen in the various views. In order to again power the aerator, connectors 33 and 34 are re-engaged with terminals 31 and 32 as seen in FIG. 6.

FIG. 8

Looking at FIG. 8, this view is of a container generally designated 50, taken from above with the top closed. This container is rectangular or square in top view and horizontal transverse section. The top end of the side walls 51-54, inclusive is numbered 21a' so that such may be compared with the top 21a of wall 20a when portion or section 21 is integral therewith. Inboard of top wall portion 21a', in dotted line showing, is shelf 22', strictly analogous to and like inboard top wall portion 22 of FIG. 2.

In this case, there is but a single top closure section 55 which is hingedly mounted with respect to upper wall portion 21a' and shelf 22' by hinge 56 adjacent side wall 51. This hinged, pivotable top portion or lid 55 overlies, with its peripheral wall portions the circumferential flange or extension 22'. Tab 57 enables the easy, convenient opening and closing of the lid 55 around pivotable hinge 56.

Mounted on the top surface of lid 55, there is provided C shaped (in top plan view), three sided overlying frame receiver 58 which is analogous to member 27 in the earlier figures. A solar cell array 59 has protective border 59a and positive and negative terminals 60 and 61 connecting thereto. These are strictly analogous to terminals 31 and 32 as seen in FIG. 6. Not shown, but necessarily present if power is to be delivered from the solar cell array 59 into the container 50, are wires like wires 35 and 36 of the earlier figures and connectors 33 and 34 on the top ends thereof adapted to removably engage the terminals 60 and 61. Likewise such wires would have connectors like 39 and 40 of FIG. 2 on the lower ends thereof.

There being no intermediate hinge (like hinge 28 in the earlier figures) on the inserting and removing side of the frame 58, the solar cell array 59, 59a need only be able to be moved downwardly in FIG. 8 (in horizontal position) over the equivalent wires 35 and 36 to be removed, replaced, cleaned, repaired or the like. The floor or base upon which the solar cell array 59, 59a rests, when it is received within frame 58, must be positioned sufficiently above the top surface of the hinged door or top lid portion 55 so as to be insertable and removable without any interference with any parts of the device on the lid.

Removable and large headed retaining bolts or screws 59a can be provided on the open side of frame 58 (or frame 27) whereby to keep the solar cell panel firmly in place in the frames 27 and 58. On temporary removal of such stops, the solar cell panel or panels may be removed and replaced and then re-fixed in position by return of the stops 58a to their regular position after the panel 59 is in frame 58.

With the provision of the solar panel 59, 59a on the top closure 55 with but a single hinge 56 employed therewith, thereby, contrary to the showing in FIG. 5, the entire top end closure panel or lid 55 pivots around hinge 56 upwardly and downwardly in opening and closing. In this case it becomes possible for the solar cell panel to be positioned, in use, at an angle other than the normally horizontal panel of the earlier FIGS. 1–6, inclusive. That is, placing a cylindrical, square, rectangular, triangular, etc. longitudinal transverse section rod or props under the closure 55 anywhere along the walls 52 and 54 will operate to wedge open the lid 55 in an angle extending upwardly from hinge 56 toward the panel edge having tab 57 thereon. Any angular or arcuate displacement desired, from a few degress above horizontal to 15°, 30°, 60° or the like or even greater may be obtained with respect to closure panel 55 with a suitably structured prop so that the sun's rays, when the solar panel is arcuately elevated as noted and turned toward the sun will receive the most direct and efficient impact of the sun's rays thereon. This can be important in hazy weather, seasonal displacement of the sun from relatively vertical overhead or rising and declining of the sun in the sky as the day begins and ends.

FIG. 9

FIG. 9 shows a variation in structure of a solar cell panel received in a top closure or lid on a water containing vessel analogous to that seen in FIG. 2. The container or vessel in FIG. 9 is shown as of substantially cylindrical form having a circular or oval transverse horizontal section defined by continuous side wall 70. Normally vertical wall 70 has a normally horizontal top edge 70a thereto. A circumferential, peripheral ring 71 has a recessed underside at 72 whereby the top closure 73 inboard of ring 71 may circumferentially overlie, in the outboard circumferential, peripheral portion 73 thereof, top edge 70a of vertical wall 70. By grasping opposite sides (180° opposed portions of the underside 71a of ring 71), the user or operator may lift the top closure off the top 70a of wall 70 and/or replace same thereon with the inwardly facing periphery 72 of the lower part of ring 71 abutting against the outer face 70b of wall 70 at the upper end thereof as seen in FIG. 9.

At this point it may be noted that any of the tops or closure members of the containers illustrated and described in this text may have, formed therethrough, as many air inlet and ventilation openings as may be required by the work member inside the container in the particular use it is performing, such as (as here seen) aerating water for bait fish or minnows. When the top or lid is opened and held or braced open as previously described with respect to FIG. 8, sufficient air will be available through the open portion of the top or lid. Likewise, if (see FIG. 5) the top portion 29 is to be braced open at any angle from the vertical full line showing of FIG. 5 to the horizontal closed position thereof seen in FIG. 1–3, inclusive, ambient air may also have access to the interior of the container. If ventilation openings are provided in any of the top members, such may be provided with optional closures or plugs for different uses of the container where air is not needed inside thereof or for storage.

Returning to FIG. 9, C section (in vertical section as seen) floor portion 74 is removably receivable within recess 75 formed in the inboard portion of top 71, 73. Recess 75, in top plan view, may be square, rectangular, oval, circular or the like, depending upon the shape of the solar cell array 76 carried thereby. Solar cell array 76 is shown inset within recess 77 in the central upper portion of base 74.

Thus, FIG. 9 shows a solar cell array or panel base 74 carrying the solar panel member 76 in the top portion thereof said base 74 inset into the top closure of a container where the top closure is not hinged as seen in FIGS. 1–6, inclusive or FIG. 8. Similar electrical connections as seen in FIGS. 6, 7 and 4, as well as 2 and 3 may be employed with the solar panel array 76, provided the terminals thereof (analogous to 31 and 32 of FIG. 6) project upwardly a sufficient distance from the peripheral suface of the solar array and its base that they can be engaged by suitable connectors as at 33 and 34 in FIG. 6.

It thus may be seen that system and processes have been disclosed wherein, first, a solar cell array may be employed to energize and drive work such as an aerator through the top of a container, the solar cell panel or array being positioned on and fixed (preferably removably) to the upper outer surface of the top or lid of the container. Likewise, it has been shown that the solar cell panel can be employed to recharge a battery which may be useable with the subject device and constructions. Thirdly, it may be seen that the solar cell panel may be disconnected from the work inside the container when insufficient sunlight and energy is available as early in the morning, late in the evening and at night whereby a battery, rechargeable or not, may be used to power the work unit inside the container. Yet alternatively, it has been disclosed that the battery may be employed to power the work inside the container while the solar cell array is simultaneously employed to recharge the battery.

Still further, container top or lid constructions carrying solar cell panels and arrays have been disclosed which container top closures or lids may be angled upwardly from the horizontal to best and most efficiently catch the sun's rays (the solar cell panel preferably being at right angles to the line of light from the sun) when the bait box is arranged so that the sunlight impinges directly upon the solar panel at the right angles thereto.

FIG. 10

Figure 10:
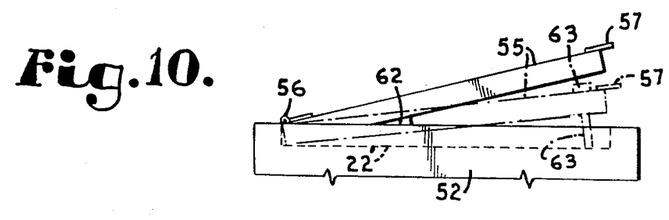
FIG. 10 is a fragmentary, top, side view of the upper end of the container seen in FIG. 8 with the full line showing indicating the lid or top of the container being propped upwardly at an angle of substantial magnitude in the range of 30°, while the dotted line showing of FIG. 10 is the said lid or top opened to a certain but lesser degree primarily for the purpose of giving air access into the container.

FIG. 10 is a view of the container and lid of FIG. 8 taken from the left hand side of FIG. 8 looking to the right in the view. In this view, in full lines, the lid or top 55 is shown wedged upwardly in the amount of 30° or so from the horizontal and maintained in that position by wedge shaped beam or rod 62. As the beam 62 is moved to the right in the view of FIG. 10, between the container top and the lid, the angle of the lid 55 with respect to horizontal lessens. Beams 62 extends entirely under lid 55 and overlies the opposed portions 21a' of the top of the container wall on both sides of the lid as seen in FIG. 8.

The purpose of wedging the top or lid 55 upwardly are two fold. First, and necessary, is that lid or top 55 should be held open enough to provide sufficient fresh air to enter the top of the container to effectively aerate the water body 19 in FIG. 2. The water free air space 19b of FIG. 2, which is positioned over the top 19a of water body 19 in the container of FIG. 2 (and in any container where a device such as the aerator 41 would be employed) must have access to ambient air as the oxygen therein is used. Fresh air must be provided while the live bait is in the water in the bucket. The second (and less necessary, but advantageous at times) contingency in the provision of a wedging beam, stick or rod as at 62 is to wedge the lid 55 upwardly at an angle from the horizontal to best receive rays from the sun when it is rising or declining somewhat in the sky (morning and late afternoon).

In dotted lines in FIG. 10, there is shown the lid 55 propped upwardly a sufficiently amount that fresh air can enter the container, such accomplished by screws or bolts 63 which may be threaded into prepared passageways in or near the free end of lid 55 or along the opposed sides thereof. Such screws or bolts are preferably dual with one of each side of the lid near to walls 52 and 54 of FIG. 8. The lower ends of the screws or bolts 63 rest on the inner top edge flange 22' of the container. Pluggable openings may also be provided in lid 55 or lid portion 29. In the latter case, there may be a problem of sufficient space available on the lid for such. However, the air is best provided to the inside of the subject bait containers by an upwardly angled or canted top or lid in its entirety or a portion thereof (FIG. 5).

FIG. 11

Figure 11:
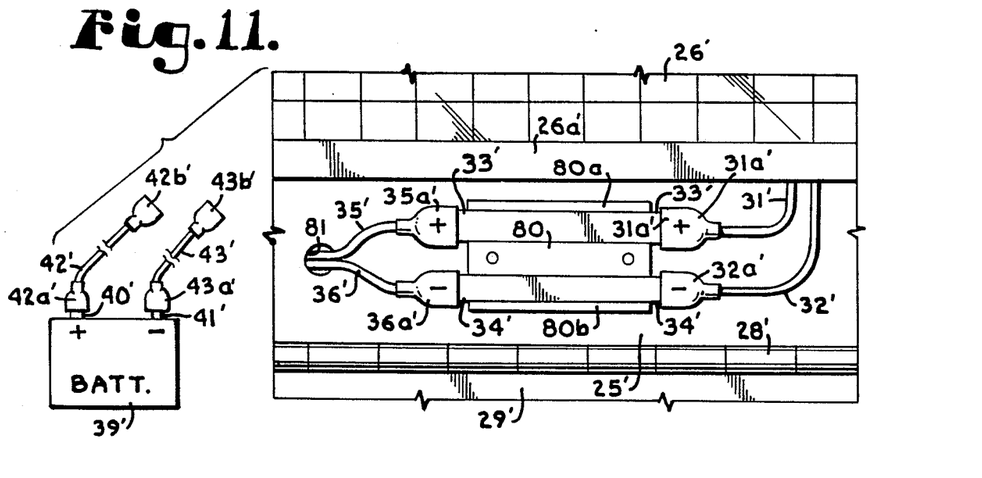
FIG. 11 is a fragmentary top view of a portion of the container top of FIG. 3 (a portion thereof enlarged in FIG. 6) where the electrical connections between the solar panel and the wires to the aerator or work inside the container is performed in a different manner, the portion of the figure to the left schematically indicating a battery with its wiring hook up to cooperate with the construction of the right hand side of the figure.

Looking at FIG. 11, therein is shown an alternative manner of supplying electrical current either from the solar panel to the aerator motor or from a battery to the aerator motor. In this view, parts are numbered the same, but primed, which corresponds to parts seen in FIGS. 1-6, inclusive. This view is like that of FIG. 6, but larger.

In the view of FIG. 11, the solar panel may be seen at 26'. The rim or border of panel 26' is 26a'. In FIG. 6, the current takeoff from the solar panel are shown as terminals on which connector shoes 33 and 34 fit. In this FIG. 11 showing, alternatively, the current takeoffs from the solar panel are wires or leads 31' and 32' which have connector shoes or cups 31a' and 32a' on the free ends thereof. There is a terminal board 80 removably fixed to the half of the top 25' which carries the solar panel 26' as is seen in FIGS. 1 and 3, particularly. Hinge 28' is shown dividing top portion 29' from top portion 25'. Two current connections with terminals 33' and 34' on each end thereof are fixed on terminal board 80 with the right hand ends thereof removably engageable by the connector shoes or cups 31a' and 32a' on the ends of wires or lines 31' and 32'. To the left center of the view, there is seen a single opening 81 through which insulated wires 35' and 36' lead through top portion 25' to the motor terminals (not seen). The connector shoes or cups 35a' and 36a' at the top ends of wires 35' and 36' are removably engageable with the left hand terminal ends 33' and 34'. Wires 35' and 36' lead to the atomizer of aerator 41 of FIG. 2 in the manner as seen in FIG. 2.

Thus it can be seen that, where the power takeoff from the solar panel is by wires 31' and 32', such wires may be removably connected to the one end of current connections or terminal strips 33' and 34' to whose opposite ends the wires 35' and 36' are removably connectible to drive the aerator or whatever work is provided in the container.

To the left of the fragmentary view of the top of the container of FIG. 11, there is shown a battery 39' having positive post 40' and negative post 41'. Wires 42' and 43' are removably connected to posts 40' and 41' by connector shoes or cups 42a' and 43a'. When wires 31' and 32' are disconnected from the right hand ends 33' and 34' of the terminals on the terminal board, then connector shoes or cups 42b' and 43b' may replace the connector shoes 31a' and 32a' engaging the right hand ends of the said terminal whereby the solar panel will not be supplying electricity to the motor, only the battery.

The right hand ends of terminal strips 33' and 34' of FIG. 11 may be bifurcated (FIG. 13) so that one set of ends thereof may be electrically engaged by connector shoes 31a' and 32a' on solar panel leads 31' and 32' and the second part of the ends of the said terminals simultaneously receive connector shoes 42b' and 43b' from the battery. In the latter described manner, current is supplied by the solar panel to the wires 35' and 36' and, additionally, the same by wires 42' and 43' from battery 39'. In this case, when the battery is low or discharged, any extra current available from solar panel 26' over that required to drive the aerator motor will be "dumped" to battery 39', recharging it.

In order to merely recharge the battery 39' from the solar panel when the aerator or other work in not being operated, connector shoes 35a' and 36a' on wire 35' and 36' are removed from the left hand ends of the terminals 33' and 34' in FIG. 11. These, then, may be replaced, respectively, by shoe 42b' on the left hand end of positive terminal 33' and connector shoe 43b' engaging the left hand end of terminal 34'. Thus, with the current terminals of the solar panel being connected to wires 42' and 43' and thus battery 39' through terminal strips 33' and 34', the panel may charge the battery directly.

Figure 12A:
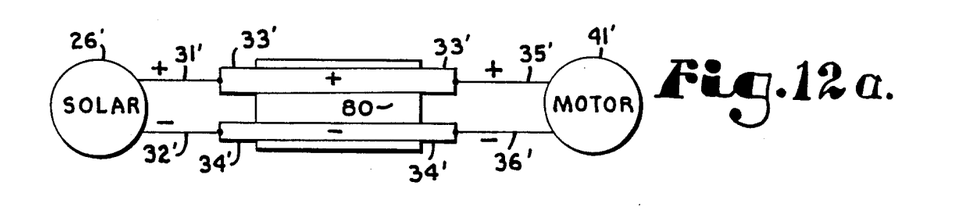

FIGS. 12a, b and c

Figure 12B:
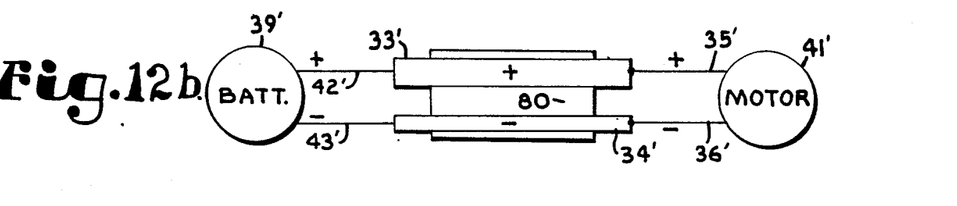
Figure 12C:
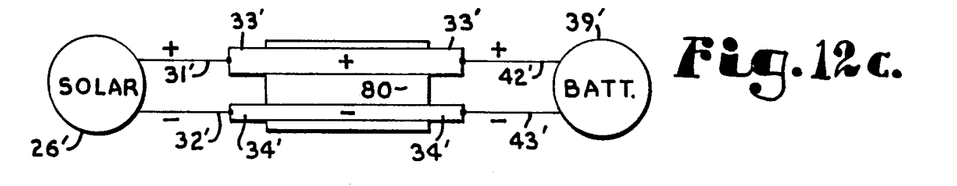

The next three figures, FIGS. 12a', b' and c' show schematic diagrams of the circuits previously discussed. In FIG. 12(a), the solar panel is schematically indicated at 26' connecting to, in this view, the left hand end of terminal strips 33' and 34'. On the right, the motor (of the aerator) 41' receives the current from the other ends 34' of the terminal strips.

FIG. 12(b) shows another option where the battery is running the motor without help from the solar panel. Thus battery 39' through lines 42' and 43', as well as terminals 33' and 34' connects with wires 35' and 36' to motor 41'.

In FIG. 12(c) the solar panel 26' connects with battery 39' through wires 31' and 32', terminal strips 33' and 34' and wires 42' and 43'.

FIG. 13

Figure 13:
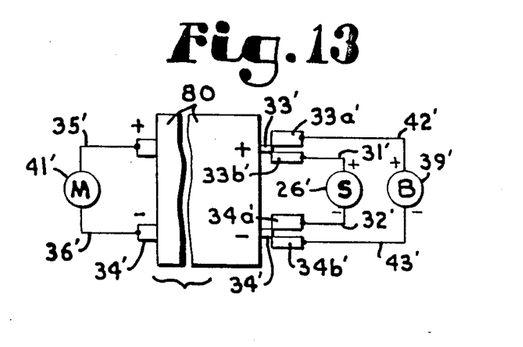
FIG. 13 is an enlarged detail of the electrical connections between the motor, the solar cell array and the battery when the solar cell and battery are both hooked up to drive the motor with the power from the solar cell to be dumped to the battery to the extent the battery is already drained or exhausted.

FIG. 13 shows, on the right hand side of terminal block 80, bifurcated terminals 33' (positive) and 34' (negative) each end thereof having two separate parts 33a' and 33b' for one end of the terminal 33' and two parts 34a' and 34b' for the negative terminal 34'. Battery 39' may connect by wires 42' and 43' with terminal parts 33a' and 34b'. Solar cell 26' communicates with terminal portion 33b' and 34b' through wires 31' and 32'. At the other end of terminals 33' and 34', wires 35' (positive) and 36' (negative) connect to the aerator motor 41'.

FIG. 14

Figure 14:
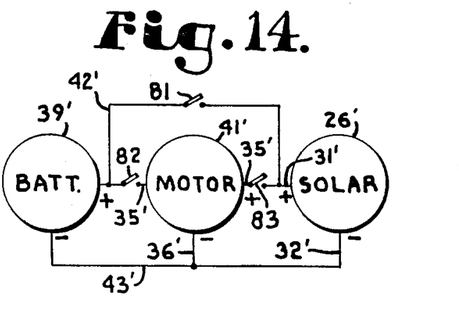
FIG. 14 is a schematic circuit diagram showing the solar cell panel at the top, the motor of the work inside the container (the aerator) and the battery whereby switches can power the motor by either solar or battery or both with battery recharging.

In FIG. 14, a simple circuit diagram is provided to represent all the showings of FIGS. 12(a) through 12(c) and 13. In this case, with respect to the lines already numbered with respect to FIGS. 12 and 13, switches 81, 82 and 83 are provided on the lines noted and previously numbered. If switch 81 is closed and 82 and 83 are open, the solar power or panel 26' recharges the battery 39'. If switch 82 is closed and switches 81 and 83 left open, then the battery 39' drives the aerator motor 41'. If switch 83 is closed, while switches 81 and 82 are left open, then the solar panel drives the motor 41'. If all of the switches 81, 82 and 83 are closed, then the effect is the same as in FIG. 13, specifically, solar panel 26' and battery 39' will drive motor 41 except in the case of a nearly discharged or exhausted battery, in which case excess electrical power from solar panel 26' over that required to drive the motor on the aerator 41' will be "dumped" to the battery 39', recharging it.

Solar panels have P and N junctions. P junction is positive and the N junction is negative (signs plus and minus). DC motors also have plus (positive) and minus (negative) polarity. If the polarity is reversed, and the motor is reversible, the motor will normally reverse direction. Reversing polarity in the subject application and disclosure does not serve a purpose.

Batteries also have positive and negative terminals and, therefore plus (positive) connections and minus (negative) connections must always be connected together (plus to plus and minus to minus) when running the motor directly by the solar panel or running the motor directly by the battery. Yet further, while charging the battery directly by the solar panel. As noted, providing the current (amperage) is sufficient, from the solar panel, to meet the amperage requirements of the motor, any surplus amperage may be dumped to the battery. If the battery has been totally discharged, all current would pass only to the battery. If the battery was in a fully charged state, the current would be consumed by the motor and the surplus current would keep the battery in a top-off state.

The battery can be stored in the lid of the container or employed as a separate accessory with respect to the minnow bucket. The manner seen in the above noted prior art patent of mounting battery cells on the side of the top edge of the container may be employed. Preferably, a rechargeable battery is used for the purposes previously mentioned. FIGS. 12 and 13 and, also, FIG. 14 show the means of switching from solar to motor, battery to motor or solar to battery, etc., either by electrical switch mechanisms or by jumping wires.

FIG. 11 shows a terminal block 80 with two positive 0.25 inch width male tabs on one side 80a thereof and two 0.187 inch width male negative tabs on the other side 80b. The wires 31', 32' on the solar panel 26' would have a female 0.25 connector 31a attached to the positive lead and a 0.187 connector 32a attached to the negative lead. The wires 35' and 36' on the motor 41' would have a female 0.25 connector 35a' attached to the positive lead and a 0.187 36a' connector attached to the negative lead. When both the motor leads and the solar panel leads are connected to the terminal block, one has completed the circuit and it is properly polarized.

The battery would typically have 18 to 20 inch wire leads (if independent from the bucket) and 4 to 5 inch leads if housed in the bucket lid or elsewhere. The plus lead from the positive terminal of the battery would have a 0.250 inch connection with the negative lead from the negative terminal of the battery having a 0.187 inch connector thereon.

From the foregoing, it will be seen that this invention is one well adapted to attain all of the ends and objects hereinabove set forth together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawing is to be interpreted as illustrative and not in a limiting sense.

We claim:

1. A live fishing bait bucket or container having a normally substantially vertical side wall with a normally substantially horizontal bottom wall, said container adapted to receive therewithin a body of water to receive and maintain live fishing bait such as minnows therewithin, the upper surface of the body of water being positioned below the top end of the container,
    said closure having an openable and closeable top cover or lid therewith,
    an electric motor powered aerator device within said container operable to aerate a body of water received in said container,
    a solar cell panel mounted on the upper surface of the container cover or lid having positive and negative electrical current terminals associated therewith so that current may be drawn from the solar panel,
    a pair of insulated electric wires communicating through said container top or lid from the solar panel electrical terminals to the electrical terminals associated with said aerator electrical motor,
    one upper end of said wires removably connected to the current outlet terminals of the solar panel and the other ends of said wires connectible to the power terminals of the aerator electric motor.

2. A container as in claim 1 including a rechargeable battery associated with said container and having positive and negative posts or terminals associated therewith, a second pair of insulated electric wires or lines removably connectible at their outer ends to the said battery posts, said second pair of wires removably connectible at their inner ends to the upper outer ends of the first pair of wires, whereby electrical energy from the battery may drive the aerator electric motor independent of any current from the solar panel array,
    the inner ends of the second pair of wires alternatively connectible to the power terminals of the solar cell panel whereby the battery may be recharged by electrical energy from the solar panel.

* * * * *